(12) United States Patent
Kim et al.

(10) Patent No.: US 11,938,741 B2
(45) Date of Patent: Mar. 26, 2024

(54) INKJET PRINTING METHOD AND METHOD FOR CREATING IMAGE FILE FOR INKJET PRINTING

(71) Applicant: Samsung Display Co., LTD., Yongin-si (KR)

(72) Inventors: Min Kyu Kim, Asan-si (KR); Hyung Jun Kim, Seoul (KR); Hong-Ju Mun, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 178 days.

(21) Appl. No.: 17/705,566

(22) Filed: Mar. 28, 2022

(65) Prior Publication Data
US 2023/0030802 A1    Feb. 2, 2023

(30) Foreign Application Priority Data
Jul. 27, 2021   (KR) .................. 10-2021-0098538

(51) Int. Cl.
*B41J 2/21*   (2006.01)
*G06K 15/02*   (2006.01)
*G06K 15/10*   (2006.01)

(52) U.S. Cl.
CPC .......... *B41J 2/2103* (2013.01); *G06K 15/102* (2013.01); *G06K 15/1848* (2013.01)

(58) Field of Classification Search
CPC .... B41J 2/2103; B41J 11/0015; B41J 29/393; G06K 15/102; G06K 15/1848; G06K 15/1878; B41M 5/0017
See application file for complete search history.

(56) References Cited

U.S. PATENT DOCUMENTS 10,621,764 B2 *   4/2020   Kavidayal .............. G06N 3/084

FOREIGN PATENT DOCUMENTS

| KR | 1020170059540 A | 5/2017 |
|----|-----------------|--------|
| KR | 102185496 B1 | 12/2020 |
| KR | 1020210023285 A | 3/2021 |

* cited by examiner

*Primary Examiner* — Bradley W Thies
(74) *Attorney, Agent, or Firm* — CANTOR COLBURN LLP

(57) ABSTRACT

An inkjet printing method includes: preparing a shape drawing; creating an image for an inkjet printing based on a color table or a boundary table; applying the image for the inkjet printing to an inkjet apparatus; and performing the inkjet printing based on the image by the inkjet apparatus, where the creating the image for the inkjet printing includes converting the shape drawing into a vector image, converting the vector image into a raster image, and converting the raster image into the image for the inkjet printing which is a black-and-white image.

20 Claims, 12 Drawing Sheets

FIG. 4

|         | R   | G   | B   |
|---------|-----|-----|-----|
| Red     | 255 | 0   | 0   |
| Yellow  | 255 | 255 | 0   |
| Green   | 0   | 255 | 0   |
| Cyan    | 0   | 255 | 255 |
| Blue    | 0   | 0   | 255 |
| Magenta | 255 | 0   | 255 |

|      | Cyan | Blue | PC1 | Green | PC2 |
|------|------|------|-----|-------|-----|
| Cyan |      | ○    | ○   | ○     | ○   |
| Blue | ○    |      | ○   |       | ○   |
| PC1  | ○    | ○    |     | ○     |     |
| Green| ○    |      | ○   |       | ○   |
| PC2  | ○    | ○    |     | ○     |     |

(B)

|     | R   | G   | R   |
|-----|-----|-----|-----|
| PC1 | 0   | 128 | 128 |
| PC2 | 128 | 128 | 128 |

INKJET PRINTING METHOD AND METHOD FOR CREATING IMAGE FILE FOR INKJET PRINTING

This application claims priority to Korean Patent Application No. 10-2021-0098538, filed on Jul. 27, 2021, and all the benefits accruing therefrom under 35 U.S.C. § 119, the content of which in its entirety is herein incorporated by reference.

BACKGROUND

1. Field

The disclosure relates to an inkjet printing method and a method for creating an image file for an inkjet printing.

2. Description of the Related Art

In manufacturing a device including a semiconductor, an inkjet printing process may be used to form a color filter, an adhesive layer, an insulating layer, or the like. Such an inkjet printing process may be one of various methods for forming each layer.

The inkjet printing process may be effective in forming organic materials, which may be printed to have a specific pattern during the inkjet printing. When an image that an inkjet printing device may read is input to the inkjet printing device, the inkjet may be printed based on the image.

SUMMARY

Embodiments are to provide an inkjet printing method and a method for creating an image file for inkjet printing that enables inkjet printing without a distortion or loss on a curved line.

An embodiment of an inkjet printing method includes: preparing a shape drawing; creating an image for an inkjet printing based on a color table or a boundary table; applying the image for the inkjet printing to an inkjet apparatus; and performing the inkjet printing based on the image by the inkjet apparatus, where the creating the image for the inkjet printing includes converting the shape drawings into a vector image, converting the vector image into a raster image, and converting the raster image into the image for the inkjet printing which is a black-and-white image.

In an embodiment, the vector image may only include primary colors or a color equivalent to the primary colors included in the color table.

In an embodiment, the primary colors may be red, green, blue, cyan, yellow, and magenta.

In an embodiment, the color equivalent to the primary colors may be a color formed by combining two or more colors of the primary colors into an intermediate gray.

In an embodiment, the intermediate gray may be a 127 gray or a 128 gray for 256 gray.

In an embodiment, the primary colors or the color equivalent to the primary colors are in direct contact with each other in the vector image.

In an embodiment, the creating the image for the inkjet printing based on the color table or the boundary table may include disposing colors based on the boundary table representing colors allowed to be disposed adjacent to each other among the primary colors or the color equivalent to the primary colors included in the color table.

In an embodiment, blue and green may not be allowed to be disposed adjacent to each other.

In an embodiment, the color equivalent to the primary colors may be a color formed by combining two or more colors among the primary colors into an intermediate gray, the color equivalent to a first primary color may be a color formed by combining the intermediate gray of green and the intermediate gray of blue, and the color equivalent to the first primary color may be allowed to be disposed adjacent to green, cyan, and blue.

In an embodiment, the color equivalent to a second primary color may be a color formed by combining an intermediate gray of red, an intermediate gray of green, and an intermediate gray of blue, and the color equivalent to the second primary color may be allowed to be disposed adjacent to green, cyan, blue, and the color equivalent to the first primary color.

In an embodiment, the converting the vector image into the raster image may include changing a resolution of the vector image to match a resolution used in the image for the inkjet printing.

In an embodiment, the inkjet apparatus may include a first head and a second head, and an overlapping part of the first head and an overlapping part of the second head may respectively print a same region.

In an embodiment, a method for creating an image file for an inkjet printing, which is to be applied to an inkjet apparatus, includes: converting a shape drawing into a vector image; converting the vector image into a raster image; and converting the raster image into the image for the inkjet printing which is a black-and-white image.

In an embodiment, the vector image may only include primary colors or a color equivalent to the primary colors, the primary colors may be red, green, blue, cyan, yellow, and magenta, and the color equivalent to the primary colors may be a color formed by combining two or more colors of the primary colors into an intermediate gray.

In an embodiment, the intermediate gray may be a 127 gray or a 128 gray for 256 gray.

In an embodiment, the primary colors or the color equivalent to the primary colors are in direct contact with each other in the vector image.

In an embodiment, the converting the shape drawing into the vector image may include disposing colors based on a boundary table representing colors allowed to be disposed adjacent to each other among the primary colors or the color equivalent to the primary colors.

In an embodiment, blue and green may not be disposed adjacent to each other.

In an embodiment, the color equivalent to the primary colors may be a color formed by combining two or more colors among the primary colors into an intermediate gray, the color equivalent to a first primary color may be a color formed by combining the intermediate gray of green and the intermediate gray of blue, the color equivalent to a second primary color may be a color formed by combining an intermediate gray of red, an intermediate gray of green, and an intermediate gray of blue, the color equivalent to a first primary color may be allowed to be disposed adjacent to green, cyan, blue, and the color equivalent to the second primary color, and the color equivalent to the second primary color may be allowed to be disposed adjacent to green, cyan, blue, and the color equivalent to the first primary color.

In an embodiment, the converting the vector image into the raster image may include changing a resolution of the vector image to match a resolution used in the image for the inkjet printing.

According to embodiments, a basic image file for creating a black and white image for the inkjet printing file used in the inkjet printing is created using only the primary colors or the color equivalent thereto, such that no distortion or loss occurs during the inkjet printing by preventing gray areas from being created in black and white image files.

BRIEF DESCRIPTION OF THE DRAWINGS

FIG. 4 is a table showing a color table for generating a vector image according to an embodiment.

FIG. 5 is a view showing an additional color table and a boundary table for creating a vector image according to an embodiment.

DETAILED DESCRIPTION

Figure 1:
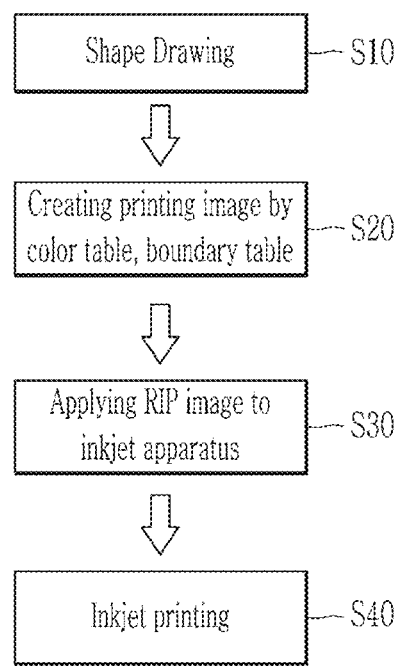
FIG. 1 is a flowchart sequentially showing an inkjet printing method according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Further, the size and thickness of each of elements that are displayed in the drawings are described for better understanding and ease of description, and the invention is not limited by the described size and thickness. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Further, in the specification, the phrase "on a plane" means when an object portion is viewed from above, and the phrase "on a cross-section" means when a cross-section taken by vertically cutting an object portion is viewed from the side.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

First, an embodiment of an inkjet printing method will be described with reference to FIG. 1.

FIG. 1 is a flowchart sequentially showing an inkjet printing method according to an embodiment.

In an embodiment, as shown in FIG. 1, the inkjet printing method includes preparing a shape drawing (S10), creating an image for inkjet printing by a color table and/or a boundary table (S20), applying the image for the inkjet printing to an inkjet apparatus (S30), and performing printing by an inkjet method (or the inkjet printing) by an inkjet apparatus (S40).

Each process thereof will hereinafter be described in detail.

In an embodiment of the inkjet printing method of FIG. 1, the preparing of the shape drawing (S10) determines whether the inkjet printing is formed of a pattern and prepares a shape drawing image corresponding to the pattern. In such an embodiment, the image that is the basis of the pattern to be finally inkjet-printed is prepared, and subsequently, the prepared shape drawing image is converted into the image file that may be used in the inkjet apparatus.

In an embodiment, a color table and/or a boundary table is used when converting the prepared shape drawing image into the image file that may be used in the inkjet apparatus. In such an embodiment, the creating (S20) of the image for the inkjet printing by the color table and/or the boundary table may include converting the prepared shape drawing image by using only colors displayed on the color table.

Here, the colors displayed on the color table may be divided into primary colors and colors equivalent to the primary colors, and the primary colors means the six primary colors of red, green, blue, cyan, yellow, and magenta, and the color equivalent to the primary color means a color including at least two or more middle grays among the six primary colors. The middle gray may mean, for example, the gray (127 gray or 128 gray) corresponding to the intermediate gray in 256 grays (0 gray to 255 gray). In an embodiment, the color equivalent to the primary colors is indicated as PC1 and PC2 in FIG. 5, and may include various other colors.

In the creating (S20) of the image for the inkjet printing, the different primary colors or the colors equivalent to the primary colors are disposed and colored on opposing sides around the boundary line in the prepared shape drawing image, to make the boundary line clear, and are converted to finally create the image for the inkjet printing (e.g., raster image processing ("RIP") file) composed of only black and white.

In an embodiment, when disposing the primary color or the color equivalent to the primary colors to be directly in contact on opposing sides of the boundary line, the colors may be disposed in consideration of the boundary table showing the colors that are disposable adjacent to each other among the primary colors or the color equivalent to the primary colors. In such an embodiment, the colors may be disposed while additionally checking whether a gray part is not generated by using the boundary table even if the adjacent boundary is converted to the image (e.g., RIP file) for the inkjet printing, and as a result, a distortion or loss may be effectively prevented during the inkjet printing. An embodiment of the boundary table is shown in FIG. 5 (A). This will be described later in detail.

After that, the image (e.g., RIP file) for the inkjet printing of the converted black and white is applied to the inkjet apparatus (S30), and then the inkjet apparatus performs the printing based on the image (e.g., RIP file) for the inkjet printing (S40).

Hereinafter, an embodiment of the creating (S20) of the image for the inkjet printing by the color table and/or the boundary table is described in detail with reference to FIG. 2 to FIG. 7.

First, the creating (S20) of the image for the inkjet printing will be described with reference to FIG. 2.

Figure 2:
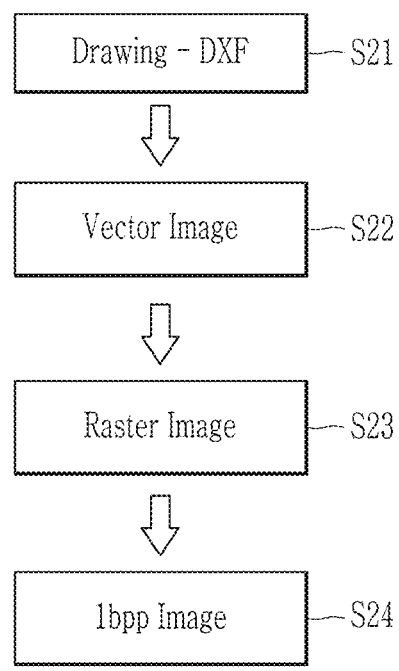
FIG. 2 is a flowchart sequentially showing a method for creating an image file for inkjet printing according to an embodiment.

FIG. 2 is a flowchart sequentially showing a method for creating an image file for inkjet printing according to an embodiment.

In an embodiment, as shown in FIG. 2, the creating (S20) of the image for the inkjet printing may include: bringing (or importing) a drawing based on the shape drawing (S21); converting the imported drawing into a vector image (S22); converting the converted vector image to a raster image (S23); and converting the converted raster image into an image (e.g., RIP file) for the inkjet printing of a black-and-white image (e.g., 1 bpp image) (S24).

In an embodiment, as shown in FIG. 2, in the bringing (S21) of the drawing based on the shape drawing, the imported drawing file may be a CAD file having a DXF file format.

Hereinafter, each process thereof will be described in detail.

In an embodiment, the bringing (S21) of the drawing based on the shape drawing is importing the shape drawing prepared in the step (S10) as the used file format (e.g., a DXF file format type), and it is desired to convert the format of the file if necessary.

Figure 3:
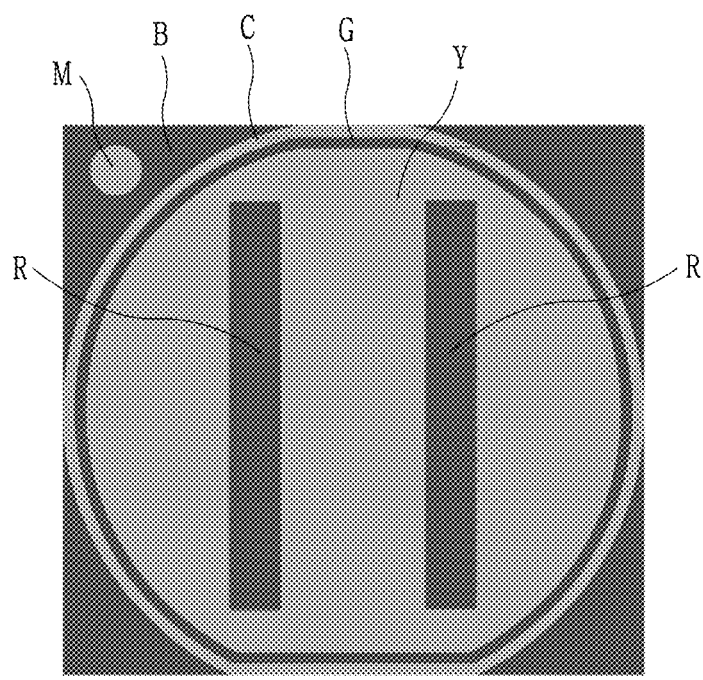
FIG. 3 is a view showing a vector image for creating an image for inkjet printing according to an embodiment.

In the converting (S22) of the imported drawing into the vector image, the imported drawing of the shape drawing is converted into the vector image expressed only with the primary colors and the color equivalent to the primary colors by using the color table and/or the boundary table. An embodiment of the converted vector image is shown in FIG. 3. Referring to FIG. 3, six primary colors (red (R), green (G), blue (B), cyan (C), magenta (M), and yellow (Y)) are used and colored to form the vector image.

In such an embodiment, the colors that may be included in the vector image may include the color equivalent to the primary colors in addition to the six primary colors. An embodiment of the color equivalent to the primary colors is further shown in FIG. 6 (B). In an embodiment, the color equivalent to the primary colors may be a color formed by combining two or more colors out of six primary colors into an intermediate gray.

In an embodiment, considering the relationship with the adjacent colors, it is possible to have a more improved characteristic during the inkjet printing. In such an embodiment, when disposing the primary colors or the color equivalent to the primary colors on opposing sides of the boundary line to form the vector image, the primary colors or the color equivalent to the primary colors may be disposed by additionally checking whether the gray is not generated even if the adjacent boundaries are converted into the image (e.g., RIP file) for the inkjet printing by using the boundary table, as a result, the distortion or loss does not occur during the inkjet printing. In such an embodiment, the image (e.g., RIP file) for the inkjet printing may include only black and white as a 1 bpp image, but if the gray is included, there is a problem that the distortion or loss occurs during the inkjet printing due to the gray. Therefore, in an embodiment of the invention, the adjacent colors may be disposed without any problem with each other so that the vector image may be converted to the image (e.g., RIP file) for the inkjet printing formed only with black and white. The boundary table is a table showing the colors that may be disposed adjacent to each other, which is shown in FIG. 5 (A).

Thereafter, the converting (S23) of the converted vector image into the raster image is performed. The raster image may be an image in which the resolution of the vector image is changed. In an embodiment, in the converting (S23) to the raster image, the resolution of the vector image may be changed based on the resolution used in the image for the inkjet printing. In such an embodiment, the primary colors and the color equivalent to the primary colors, which are included in the vector image, are also included in the raster image as it is. Referring to FIG. 6, an embodiment in which the vector image of FIG. 3 is changed into the raster image is shown. In FIG. 6, an embodiment in which the resolution in the horizontal direction is reduced and the resolution in the vertical direction is maintained among the resolutions of the vector image of FIG. 3 is shown.

Figure 7:
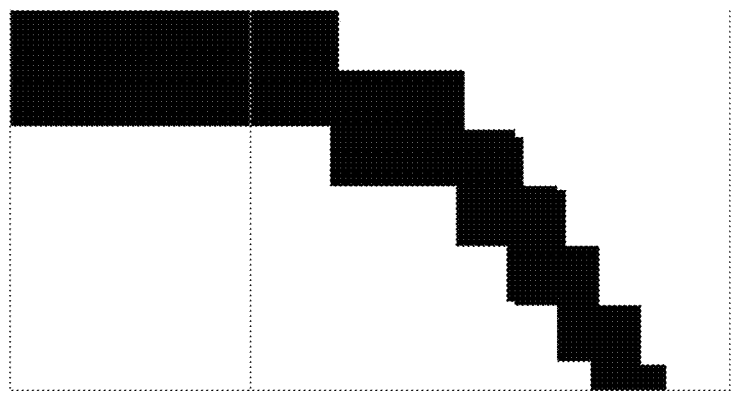
FIG. 7 is an enlarged view of a part of an image for inkjet printing converted from a raster image of FIG. 6 according to an embodiment.

After that, the converting (S24) of the converted raster image into the image (RIP file) for the inkjet printing of the black-and-white image (1 bpp image) is performed. In such an embodiment, the conversion into the image (RIP file) for the inkjet printing is completed by changing the primary colors and the color equivalent to the primary colors, which are included in the raster image, to be changed to the black-and-white image containing only black and white. The final completed image (RIP file) for the inkjet printing may not include gray other than black and white. In an embodiment, as shown in FIG. 7, a part of the finally completed image (RIP file) for the inkjet printing is shown. In general, during the inkjet printing, the distortion or loss occurs along a curved line rather than a straight line, and in the case that the distortion or loss occurs, the finally completed image (RIP file) for the inkjet printing may include a part including gray. Therefore, when creating the vector image so that gray is not included in the final completed image (RIP file) for the inkjet printing, only primary colors or the color equivalent to the primary colors are used, and the relationship between the adjacent colors may be disposed by referring to the boundary table.

Hereinafter, an embodiment of the creating (S20) of the image for the inkjet printing will be described with reference to FIG. 3 to FIG. 7.

First, FIG. 3 shows a vector image according to an embodiment.

FIG. 3 is a view showing a vector image for creating an image for inkjet printing according to an embodiment.

Referring to FIG. 3, six primary colors (red (R), green (G), blue (B), cyan (C), magenta (M), and yellow (Y)) are used and adopted to form the vector image.

The shape of the vector image in FIG. 3 corresponds to the shape of the prepared shape drawing, and the vector image does not show the boundary of the shape drawing separately, but is an image to display the boundary by using the boundary of two colors.

The colors that may be used in the vector image may include the primary colors and the color equivalent to the primary colors. The primary colors and the color equivalent to the primary colors will be described with reference to FIG. 4 and FIG. 5 (B).

In an embodiment, even if the vector image is displayed by using the primary colors and the color equivalent to the primary colors, there may be a problem in which gray is included in the image (RIP) for the inkjet printing in some cases. Therefore, even if two colors are adjacent to each other to indicate the boundary line, a table that displays the combination of the colors that do not include gray in the final image (RIP) for the inkjet printing is called a boundary table, and two colors may be adjacent based on the boundary table. One embodiment of the boundary table is shown in FIG. 5 (A).

Hereinafter, an embodiment of the used primary colors and color equivalent to the primary colors and the boundary table will be described with reference to FIG. 4 and FIG. 5.

FIG. 4 is a table showing a color table for generating a vector image according to an embodiment, and FIG. 5 is a view showing an additional color table and a boundary table for creating a vector image according to an embodiment.

First, in FIG. 4, six primary colors are summarized in a table. Six primary colors are red (R), green (G), blue (B), cyan, magenta, and yellow, and the table of FIG. 4 shows the relation with six primary colors based on red (R), green (G), blue (B). In the table of FIG. 4, 0 means a 0 gray, indicating that the color is not included, and 255 represents the highest gray as a 256 gray, indicating that the color is included to the maximum. As shown in the table in FIG. 4, for example, the magenta color includes red (R) and blue (B) as the maximum gray, and does not include green (G).

In an embodiment, the color equivalent to the primary colors may be a color formed by combining two or more colors out of six primary colors into an intermediate gray. in such an embodiment, the color equivalent to the primary colors may be a color including at least two or more of the six primary colors as the intermediate gray. Here, the intermediate gray means, for example, a gray (127 gray or 128 gray) corresponding to the intermediate gray in 256 grays (0 gray to 255 gray).

In FIG. 5(B), the color equivalent to the primary colors are expressed as two of PC1 and PC2, and PC1 and PC2 are expressed based on red (R), green (G), and blue (B).

As shown in FIG. 5 (B), the color PC1 equivalent to the first primary colors is a color of the combination of green (G) and blue (B) with the intermediate gray (128 gray) without including red (R). Also, the color equivalent to the second primary colors PC2 is a color of the combination of all of red (R), green (G), and blue (B) with the intermediate gray (128 gray). Two colors PC1 and PC2 equivalent to the primary colors are shown in FIG. 5 (B) as an embodiment, and alternatively, the two colors PC1 and PC2 may include other colors of various combinations. The color equivalent to the primary colors may be a color formed by combining two or more intermediate grays of six primary colors.

Hereinafter, the boundary table according to an embodiment will be described with reference to FIG. 5 (A).

The boundary table is a table showing whether the primary colors and the color equivalent to the primary colors used as the vector image may be adjacent to each other, and the colors that do not include gray in the final image (RIP)

for the inkjet printing even if they are adjacent to each other are marked with a circle (○) in the table.

In an embodiment, as shown in the table of FIG. 5 (A), blue (B), green (G), and the colors PC1 and PC2 equivalent to the first and second primary colors may be a color that may be adjacent to cyan. On the other hand, cyan, the color equivalent to the first and second primary colors PC1 and PC2 may be a color that may be adjacent to blue (B), and if green (G) is adjacent to blue (B), it may be inappropriate because the image (RIP) for the inkjet printing may include gray which may cause a problem. Cyan, blue (B), and green (G), the color equivalent to the second primary colors PC2 may be a color that may be adjacent to the color equivalent to the first primary colors PC1. Cyan, the color equivalent to the first and second primary colors PC1 and PC2 may be a color that may be adjacent to green (G), and blue (B) may be inappropriate to be adjacent to green (G) because gray, which may cause a problem, may be included in the image (RIP file) for the inkjet printing if blue (B) is adjacent to green (G). Cyan, blue (B), and green (G), and the color equivalent to the first primary colors PC1 may be colors that may be adjacent to the color equivalent to the second primary colors PC2.

As shown in the boundary table of FIG. 5 (A), it is desired that blue and green are not adjacent to each other, and referring to the vector image of FIG. 3, it may be confirmed that cyan is positioned between blue and green. As a result, even if the vector image of FIG. 3 is converted into the final image (RIP) for the inkjet printing, a desired image that does not include any gray may be created.

The raster image converted from the vector image of FIG. 3 will now be described with reference to FIGS. 6A and 6B.

Figure 6A:
FIG. 6A is a. view showing a raster image converted from a vector image of FIG. 3 according to an embodiment.
Figure 6B:
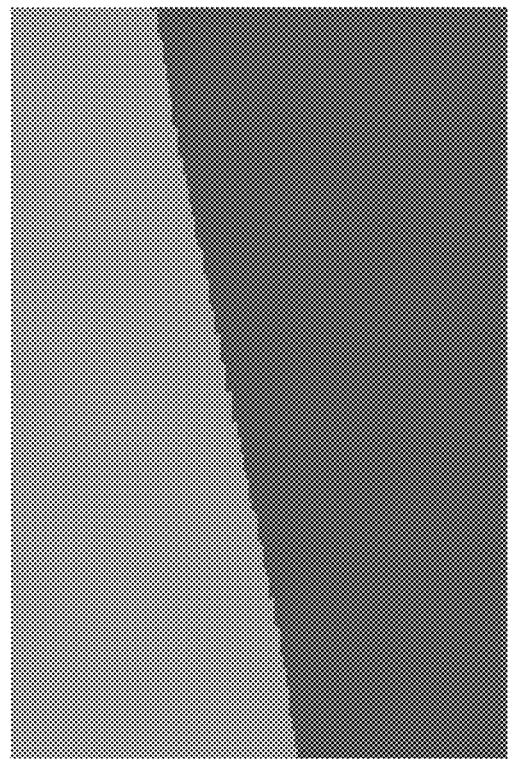
FIG. 6B is an enlarged view of the boxed portion of FIG. 6A.

FIG. 6A is a view showing a raster image converted from a vector image of FIG. 3 according to an embodiment, and FIG. 6B is an enlarged view of the boxed part of FIG. 6A.

The raster image shown in FIG. 6 is an image whose resolution has been changed from the vector image of FIG. 3. That is, compared with the vector image of FIG. 3, the raster image of FIG. 6 is an image in which only resolution of the horizontal direction is reduced, and resolution of the vertical direction is maintained.

In FIG. 6B, a part of the raster image is additionally enlarged, and as shown in FIG. 6B, when the resolution is changed, it may be confirmed that there is no separate line at the boundary of each color and two adjacent colors are in contact.

In FIG. 7, the image (RIP file) for the inkjet printing of the black-and-white image (1 bpp image) formed by converting the raster image is shown.

FIG. 7 is an enlarged view of a part of an image for inkjet printing converted from a raster image of FIG. 6 according to an embodiment.

In FIG. 7, the black-and-white image (1 bpp image) is shown, and only a part, not the entire image (RIP) for the inkjet printing, is shown.

As shown in FIG. 7, it may be confirmed that the boundary of the curved line is displayed only in black and white and does not include gray.

In an embodiment, as described in FIG. 2 to FIG. 7, the primary colors and the color equivalent to the primary colors are used to form the final black and white image for the inkjet printing, and it may be confirmed that gray is not included.

Hereinafter, the image for the inkjet printing according to a comparative example will be described with reference to FIG. 8. In the comparative example of FIG. 8, when forming the vector image, the primary colors and the color equivalent to the primary colors are not used.

The comparative example according to FIG. 8 will hereinafter be described.

Figure 8:
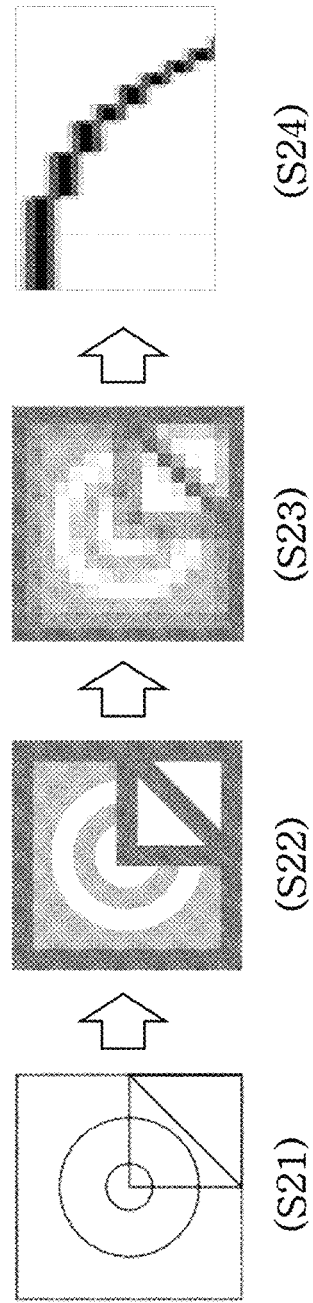
FIG. 8 is a view sequentially showing a change of an image in a creation of an image for each inkjet printing in a comparative example.

FIG. 8 is a view sequentially showing a change of an image in creation of an image for each inkjet printing in a comparative example.

In the comparative example, in the bringing (S21) of the drawing based on the shape drawing, after bring the shape corresponding thereto, and then, in the converting (S22) to the vector image, instead of using the primary colors or the color equivalent to the primary colors described in FIG. 5 and FIG. 6, common colors are used to form a vector image. After that, after the converting (S23) of the vector image into the raster image, through the final converting (S24) into the image (RIP file) for the inkjet printing, as shown in the drawing shown on the rightmost of FIG. 8, dark gray is formed at the boundary between white color and black color. That is, in the final image (RIP file) for the inkjet printing, the image including gray-based colors in addition to white and black colors is created.

As such, when the inkjet apparatus is driven using the image (RIP file) for the inkjet printing including gray, the distortion or loss occurs in the gray area, resulting in a problem in the inkjet printing.

In an embodiment of the invention, as shown in FIG. 3 to FIG. 7, if desired, when the vector image is formed by determining the adjacent color based on the boundary table while using the primary colors or the color equivalent to the primary colors, the final image (RIP file) for the inkjet printing is completed as the black-and-white image that does not include gray, so that the distortion or loss does not occur even when being applied to the inkjet apparatus.

Hereinafter, an appropriate vector image and an inappropriate vector image will be described with reference to FIG. 9 and FIG. 10.

Figure 9:
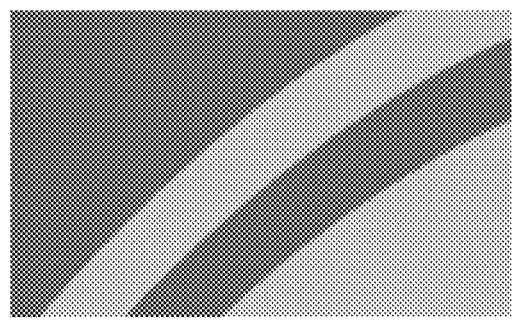
FIG. 9 is a view showing a part of a vector image appropriately created according to an embodiment.
Figure 10:
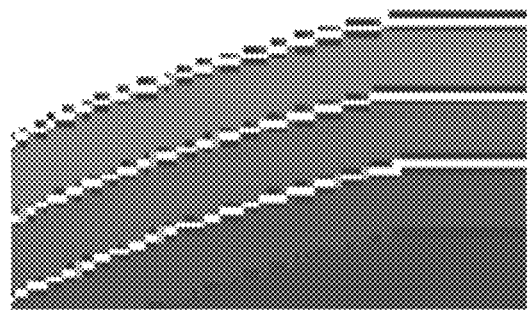
FIG. 10 is a view showing a part of an improperly created vector image.

FIG. 9 is a view showing a part of a vector image appropriately created according to an embodiment, and FIG. 10 is a view showing a part of an improperly created vector image.

First, the vector image of FIG. 9 does not include the color equivalent to the primary colors, and includes only the primary colors. In FIG. 9, the boundary appears while the primary colors are in direct contact with each other.

On the other hand, referring to FIG. 10, the primary colors are not used, and even if the primary colors are used, the white and black color pattern is included in the part corresponding to the boundary line, so there is difference that the colors do not directly contact, and a white and black color pattern is included between the colors. If the vector image as shown in FIG. 10 is converted, the final image (RIP file) for the inkjet printing includes gray due to the white/black color pattern positioned between them. In addition, the final image (RIP file) for the inkjet printing includes gray even if there is no white/black color pattern corresponding to the border because the color included in the vector image does not use primary colors or the color equivalent to the primary colors. As a result, in the case of using the vector image as shown in FIG. 10, there is a drawback that distortion or loss occurs even if it is converted to the black-and-white image and applied to the inkjet apparatus.

In an embodiment, when creating the vector image by using the primary colors or the color equivalent to the primary colors as shown in FIG. 9 and adjusting the adjacent colors based on the boundary table based on the table, even if it is converted to the black-and-white image and applied to the inkjet apparatus, there is no occurrence of distortion or loss.

Herein, the disposing of the colors adjacent to each other may mean disposing of two colors while directly contacting each other.

Various layers may be printed by the inkjet apparatus as described above, and hereinafter, a cross-section structure of a display device to which one layer of the display devices may be printed by the inkjet apparatus is briefly described.

Figure 11:
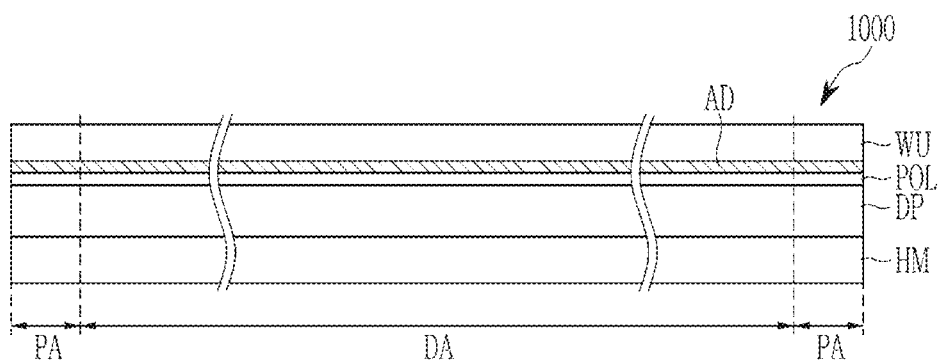
FIG. 11 is a cross-sectional view of a display device according to an embodiment.

FIG. 11 is a cross-sectional view of a display device according to an embodiment.

Referring to FIG. 11, an embodiment of a display device 1000 includes a cover window WU, a display panel DP, and a housing member HM, and a polarizer POL is positioned between the cover window WU and the display panel DP, and the polarizer POL is attached to the display panel DP by an adhesive AD. In an embodiment, the display device 1000 may further include an electronic module such as a camera or a sensor.

The cover window WU is disposed on the display panel DP to protect an upper surface of the display panel DP. The cover window WU may include a transparent region corresponding to the display area DA and a blocking region corresponding to the non-display area PA. The transparent region may be an optically transparent region, and may be a region that transmits incident light. The blocking region may be a region having relatively low light transmittance compared to the transparent region. The blocking region defines the shape of the transparent region, and the blocking region may surround the transparent region. The blocking region may indicate a predetermined color. The blocking region overlaps the non-display area PA of the display panel DP to block the non-display area PA from being viewed from an outside.

The display panel DP may be a flat rigid display panel or a flexible display panel. An embodiment of the display panel may be a light emitting type of display panel. In an embodiment, for example, the display panel may be an organic light emitting panel or a quantum dot light emitting display panel. The intermediate layer of the organic light emitting panel may include a functional layer and an emission layer, and the emission layer may include an organic light emitting material. The intermediate layer of the quantum dot light emitting display panel may include quantum dots and quantum rods. According to an embodiment, the intermediate layer of the quantum dot light emitting display panel may be an inorganic light emitting display pattern including an inorganic light emitting diode ("LED"). Hereinafter, embodiments where the display panel DP is an organic light emitting panel will be describe in detail.

In such an embodiment, the display panel DP displays the image on the upper surface. The upper surface of display panel DP includes a display area DA and a non-display area PA. The image is displayed in the display area DA. The non-display area PA may surround the display area DA.

The display panel DP may include a plurality of pixels PX positioned in the display area DA. The pixels PX may emit light in response to an electrical signal. The light emitted by pixels PX may be combined to create an image. One pixel PX includes a pixel circuit unit including a plurality of transistors and an LED that receives a current from the pixel circuit unit and emits light. The pixel circuit unit may further include a capacitor. The number of transistors and the number of capacitors included in one pixel PX, and the connection relationship, may be variously modified.

The polarizer POL may be attached to the upper surface of the display panel DP by the adhesive AD. The polarizer POL may prevent light applied from the outside from being reflected by the display panel DP and being recognized by the user. Here, the adhesive AD may be formed by the inkjet method corresponding to an embodiment of the method described above with reference to FIG. 1 to FIG. 7. In addition, according to an embodiment, the organic layer formed on the display panel DP may be formed by the inkjet method corresponding to an embodiment of the method of FIG. 1 to FIG. 7.

According to an embodiment, the display panel DP may include an opening region or a transparent region, and an electronic module such as a camera or a sensor may be positioned on a rear surface of the opening region or the transparent region.

The display panel DP includes a non-display area PA extending from the display area DA and including a plurality of signal lines and pads. A data driver may be positioned in the non-display area PA, and the pad portion of the non-display area PA may be electrically connected to a printed circuit board ("PCB") including a driving chip.

In an embodiment, the adhesive layer AD may be additionally positioned between the polarizer POL and the cover window WU. The additionally formed adhesive layer may also be formed by the inkjet method corresponding to an embodiment of the method of FIG. 1 to FIG. 7.

In an embodiment, the display panel DP may further include a touch sensor capable of detecting the user's touch. The touch sensor may be positioned on the entire surface of the pixel PX, and may include at least one touch electrode. Various methods may be applied to the touch sensor, and in an embodiment, the touch sensor may be a resistive film type or a capacitive type. The touch sensor of the capacitive type may sense a touch using one touch electrode (a self-cap method) or may sense a touch using a pair of touch electrodes (a mutual cap method).

The housing member HM is disposed on the lower side of the display panel DP. The housing member HM is combined with the cover window WU to constitute the exterior of the display device 1000. The housing member HM may include a material with relatively high stiffness. In an embodiment, for example, the housing member HM may include a plurality of frames and/or plates made of glass, plastic, and metal. The housing member HM provides a predetermined accommodation space. The display panel DP may be accommodated in the accommodation space and protected from an external impact.

Hereinafter, an embodiment of the printing method in the inkjet printing will be described with reference to FIG. 12.

Figure 12:
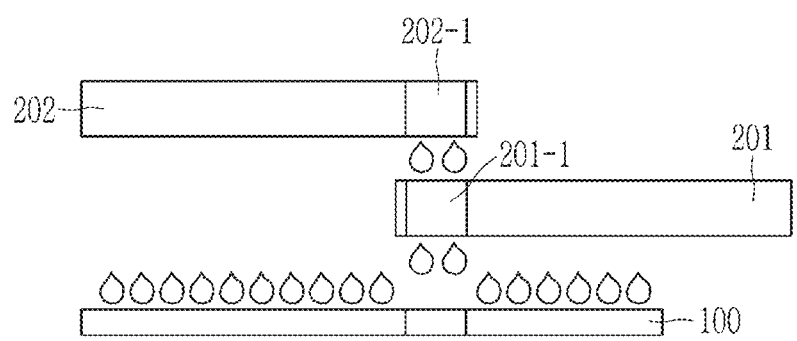
FIG. 12 is a view showing a method of coating while overlapping two inkjet heads during inkjet printing according to an embodiment.

FIG. 12 is a view showing a method of coating while overlapping two inkjet heads during inkjet printing according to an embodiment.

In FIG. 12, the process of the inkjet printing on the substrate 100 is simply illustrated, and two heads 201 and 202 included in the inkjet apparatus are illustrated. The two heads 201 and 202 may each include a nozzle, and the organic material is ejected through the nozzle by the inkjet method.

In general, the organic material sprayed from one head 201 or 202 is applied on the substrate 100 to form the final organic layer, but in at least some regions, the organic material sprayed from two heads 201 and 202, respectively, may be combined to form the final organic layer. That is, the overlapping part 201-1 of the first head 201 and the overlapping part 202-1 of the second head 202 are respectively applied in a same region, and FIG. 12 shows that the final organic layer is formed while the organic material sprayed from the overlapping parts 201-1 and 202-1 positioned on each of two heads 201 and 202 is printed together. That is, after the organic material first sprayed from the overlapping part 201-1 of the first head 201 is applied, the organic material sprayed from the overlapping part 202-1 of the second head 202 is overlapped and applied, thereby the final organic layer is formed.

In an embodiment, as described above, while the organic material being repeatedly applied multiple times, the final organic layer may be formed in a pattern corresponding to the image (RIP file) for the inkjet printing.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An inkjet printing method comprising:
preparing a shape drawing;
creating an image for an inkjet printing based on a color table or a boundary table;
applying the image for the inkjet printing to an inkjet apparatus; and
performing the inkjet printing based on the image by the inkjet apparatus,
wherein the creating the image for the inkjet printing includes:
converting the shape drawing into a vector image;
converting the vector image into a raster image; and
converting the raster image into the image for the inkjet printing, which is a black-and-white image.

2. The inkjet printing method of claim 1, wherein
the vector image only includes primary colors or a color equivalent to the primary colors included in the color table.

3. The inkjet printing method of claim 2, wherein
the primary colors are red, green, blue, cyan, yellow, and magenta.

4. The inkjet printing method of claim 3, wherein
the color equivalent to the primary colors is a color formed by combining two or more colors of the primary colors into an intermediate gray.

5. The inkjet printing method of claim 4, wherein
the intermediate gray is a 127 gray or a 128 gray for 256 gray.

6. The inkjet printing method of claim 2, wherein
the primary colors or the color equivalent to the primary colors are in direct contact with each other in the vector image.

7. The inkjet printing method of claim 6, wherein
the creating the image for the inkjet printing based on the color table or the boundary table includes disposing colors based on the boundary table representing colors allowed to be disposed adjacent to each other among the primary colors or the color equivalent to the primary colors included in the color table.

8. The inkjet printing method of claim 7, wherein
blue and green are not allowed to be disposed adjacent to each other.

9. The inkjet printing method of claim 7, wherein
the color equivalent to the primary colors is a color formed by combining two or more colors among the primary colors into an intermediate gray,
the color equivalent to a first primary color is a color formed by combining the intermediate gray of green and the intermediate gray of blue, and
the color equivalent to the first primary color is allowed to be disposed adjacent to green, cyan, and blue.

10. The inkjet printing method of claim 9, wherein
the color equivalent to a second primary color is a color formed by combining an intermediate gray of red, an intermediate gray of green, and an intermediate gray of blue, and
the color equivalent to the second primary color is allowed to be disposed adjacent to green, cyan, blue, and the color equivalent to the first primary color.

11. The inkjet printing method of claim 2, wherein
the converting the vector image into the raster image includes changing a resolution of the vector image to match a resolution used in the image for the inkjet printing.

12. The inkjet printing method of claim 1, wherein
the inkjet apparatus includes a first head and a second head, and
an overlapping part of the first head and an overlapping part of the second head respectively print a same region.

13. A method for creating an image file for an inkjet printing, which is to be applied to an inkjet apparatus, the method comprising:
converting a shape drawing into a vector image;
converting the vector image into a raster image; and
converting the raster image into an image for the inkjet printing, which is a black-and-white image.

14. The method for creating the image file for the inkjet printing of claim 13, wherein
the vector image only includes primary colors or a color equivalent to the primary colors,
the primary colors are red, green, blue, cyan, yellow, and magenta, and
the color equivalent to the primary colors is a color formed by combining two or more colors of the primary colors into an intermediate gray.

15. The method for creating the image file for the inkjet printing of claim 14, wherein
the intermediate gray is a 127 gray or a 128 gray for 256 gray.

16. The method for creating the image file for the inkjet printing of claim 14, wherein
the primary colors or the color equivalent to the primary colors are in direct contact with each other in the vector image.

17. The method for creating the image file for the inkjet printing of claim 16, wherein
the converting the shape drawing into the vector image includes disposing colors based on a boundary table representing colors allowed be disposed adjacent to each other among the primary colors or the color equivalent to the primary colors.

18. The method for creating the image file for the inkjet printing of claim 17, wherein
blue and green are not disposed adjacent to each other.

19. The method for creating the image file for the inkjet printing of claim 17, wherein
the color equivalent to the primary colors is a color formed by combining two or more colors among the primary colors into an intermediate gray, the color equivalent to a first primary color is a color formed by combining the intermediate gray of green and the intermediate gray of blue, the color equivalent to a second primary color is a color formed by combining an intermediate gray of red, an intermediate gray of green, and an intermediate gray of blue, the color equivalent to the first primary color is allowed to be disposed adjacent to green, cyan, blue, and the color equivalent to the second primary color, and the color equivalent to the second primary color is allowed to be disposed adjacent to green, cyan, blue, and the color equivalent to the first primary color.

20. The method for creating the image file for the inkjet printing of claim 14, wherein the converting the vector image into the raster image includes changing a resolution of the vector image to match a resolution used in the image for the inkjet printing.

\* \* \* \* \*